July 22, 1930.  H. S. TAYLOR  1,771,359

REAPER THRASHER AND LIKE HARVESTING MACHINE

Filed Dec. 16, 1925     6 Sheets-Sheet 1

H. S. Taylor
INVENTOR
By: Marks & Clerk
Attys

Patented July 22, 1930

1,771,359

UNITED STATES PATENT OFFICE

HEADLIE SHIPARD TAYLOR, OF SUNSHINE, VICTORIA, AUSTRALIA, ASSIGNOR TO H. V. McKAY PROPRIETARY LIMITED, OF SUNSHINE, AUSTRALIA

REAPER THRASHER AND LIKE HARVESTING MACHINE

Application filed December 16, 1925, Serial No. 75,837, and in Australia December 20, 1924.

This invention relates to improvements in reaper thrasher and harvesting machines and refers especially but is not limited to that type of machine wherein the heads of crop are removed by a reciprocating knife and are then thrashed and winnowed to recover the grain therefrom.

The invention is directed more particularly to the provision of improvements in an engine driven reaper thrasher of the "straight draught" type wherein the comb and crop gathering mechanism extend across the full width of the machine and direct the severed heads of crop and straw to an elevator leading to a thrasher associated with a winnowing apparatus situated at the rear of the main frame which is provided with forward main transport wheels and with one or more rear steering wheels and with a bagging platform having a dumping frame pivoted thereto.

The object of the present invention is to provide, inter alia, a main frame of simple and durable construction; a more efficient drive from the engine to the main transport wheel and to the operative parts of the machine; a simple and efficient drive for the reciprocating knife at the base of the comb, means for pneumatically freeing the grain and heads from the straw as it passes from the thrasher to the straw walkers or a separating sieve above the winnower associated therewith, and more efficient means for releasably supporting, tilting, and returning the dumping frame to its normal position.

I accomplish the abovementioned object by providing a main frame having a pair of parallelly disposed trussed longitudinal beams or members on the near side thereof and members disposed parallelly and diagonally therewith adapted to support the axle of the main transport wheel and the grain thrashing and cleaning mechanism; mounting the engine on the near side of the main frame and transmitting motion from drive shafts projecting laterally from the transmission case to the near side transport wheel and to the operative mechanism respectively, of the machine, through independent clutch mechanism.

The knife is operated by a sway bar and pitman actuated by a crank from a shaft for imparting motion to the gearing transmitting motion to the crop gathering and conveying mechanism.

The downward passage of the grain and heads through the straw passing from the main thrashing drum to the front end of straw walkers or a separating sieve operating above the winnower is facilitated by directing a blast of air therethrough from a fan and the hood of the straw walkers is arranged to permit the straw to be directed (more or less at right angles) across the path taken by the air blast.

The means for releasably retaining the dumping frame in position on the bag filling platform comprises pawls adapted to be released by arms on a rock shaft operated by a lever in opposition to spring pressure and one or more torsional springs are employed to return the dumping frame to its normal position after it has been tilted to deposit bags onto the ground. The rock shaft is provided with tipping arms adapted to tilt the dumping frames when the said shaft is operated.

The invention also comprises certain improvements in the construction and arrangement of the operative parts of the machine which will be more fully outlined in the following specification.

In order that the invention, the object and nature of which have been set forth, may be readily understood reference will now be had to the accompanying sheets of explanatory drawings wherein:—

In this view the dumping frame is shown in full lines in its raised position and in dotted lines in the position it assumes when the bags of grain are being dumped therefrom.

In these drawings like characters of reference have been employed to indicate the same or corresponding parts in the different views and the numeral 1 designates the main frame which is provided on its near side with a pair of trussed beams 2 and 3 which may comprise two or more superposed parallel members connected by a plurality of diagonal and vertical brace members 4 and 5, respectively, arranged to ensure ragidity of construction. These trussed beams 2 and 3 extend from near the front to the rear of the main frame and are situated one on each side of the near transport wheel 6 which is mounted on a through axle 7 adapted to support a transport wheel 8 on the offside of the machine.

The main frame also comprises one or more longitudinal beams 9 and front and rear diagonal beams 10 and 11, respectively, arranged to conveniently support the operative parts of the machine.

The subsidiary longitudinal beam 9 and the diagonal beams 10 and 11 can be made of straight bars or they can be suitably braced or trussed to provide a requisite degree of strength to withstand all abnormal strains and stresses set up when the machine is operating under adverse conditions.

An engine 12 is mounted on the main frame, preferably near the front end thereof and above the outer longitudinal beam 2, on brackets which are suitably stayed to provide a firm anchorage for the same.

The front corner on the near side of the main frame is connected by a tie rod 2' to the front of a trussed member connected to a bar 2" supported on standards 7' which project upwardly from the axle or from the main frame on each side of the near transport wheel 6.

The rear end of the trussed member is connected to the central and inner part of the main frame by means of a second tie rod 3' and the upper ends of the said tie rods are screwed to take nuts which can be adjusted to take up any overhanging strain on the front end of the near side of the frame due to the weight of the engine.

The said tie rods and trussed member extend above the main wheel 6 and effectually brace that part of the front of the main frame upon which the greatest load is carried.

Figures 1, 20, 21:
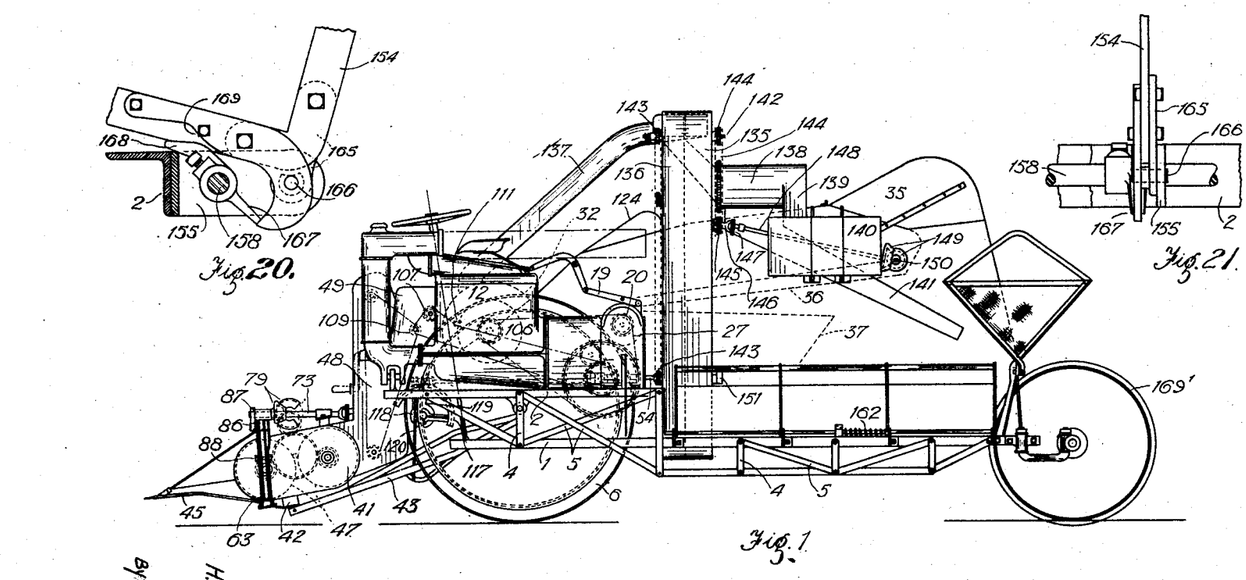
Figure 1 is a view in side elevation of a reaper thrasher machine embodying improvements constructed and arranged in accordance with the present invention.
Figure 20 is a view in sectional front elevation illustrating modified means of retaining the dumping frame in its normal position and for tilting the same when required.
Figure 21 is a view in side elevation of Figure 20.
Figures 2, 14:
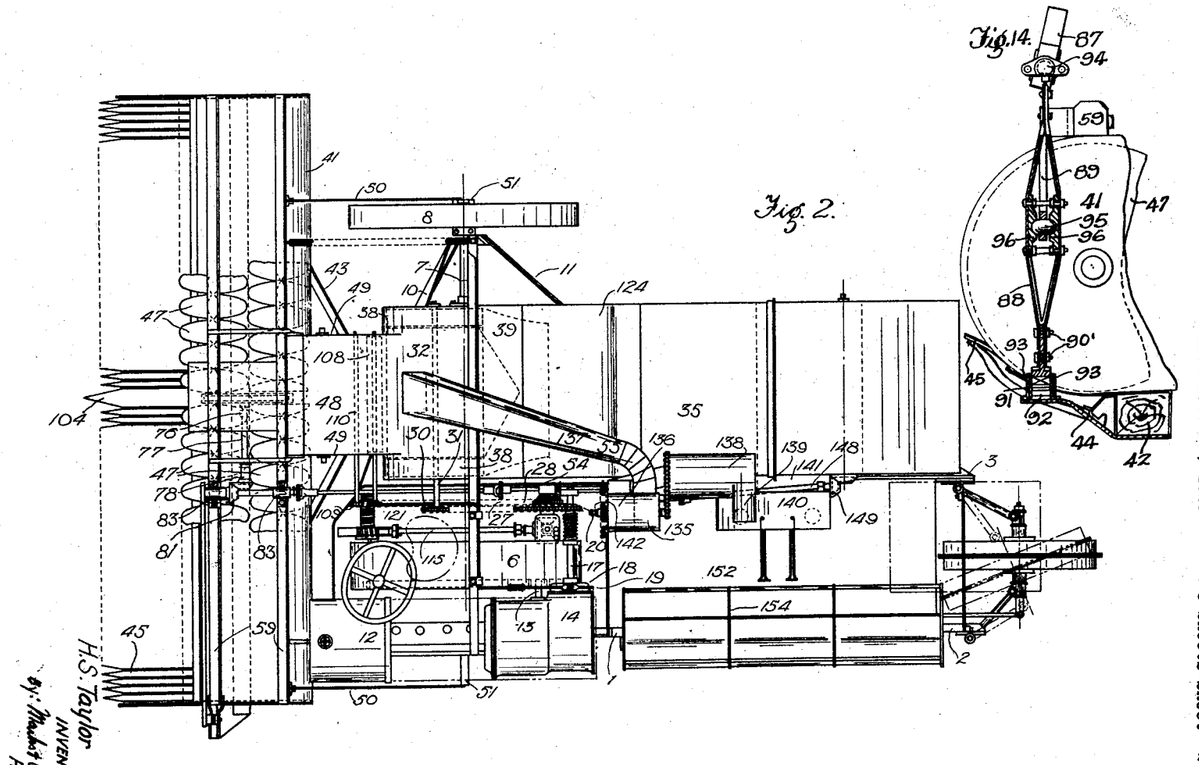
Figure 2 is a view in plan of Figure 1; parts being shown broken away for convenience of illustration.
Figure 14 is a view in sectional side elevation of part of the crop gathering mechanism and shows a sway bar (in section) for imparting motion to one end of the reaping knife and means for supporting the same.
Figures 3, 4, 5, 15:
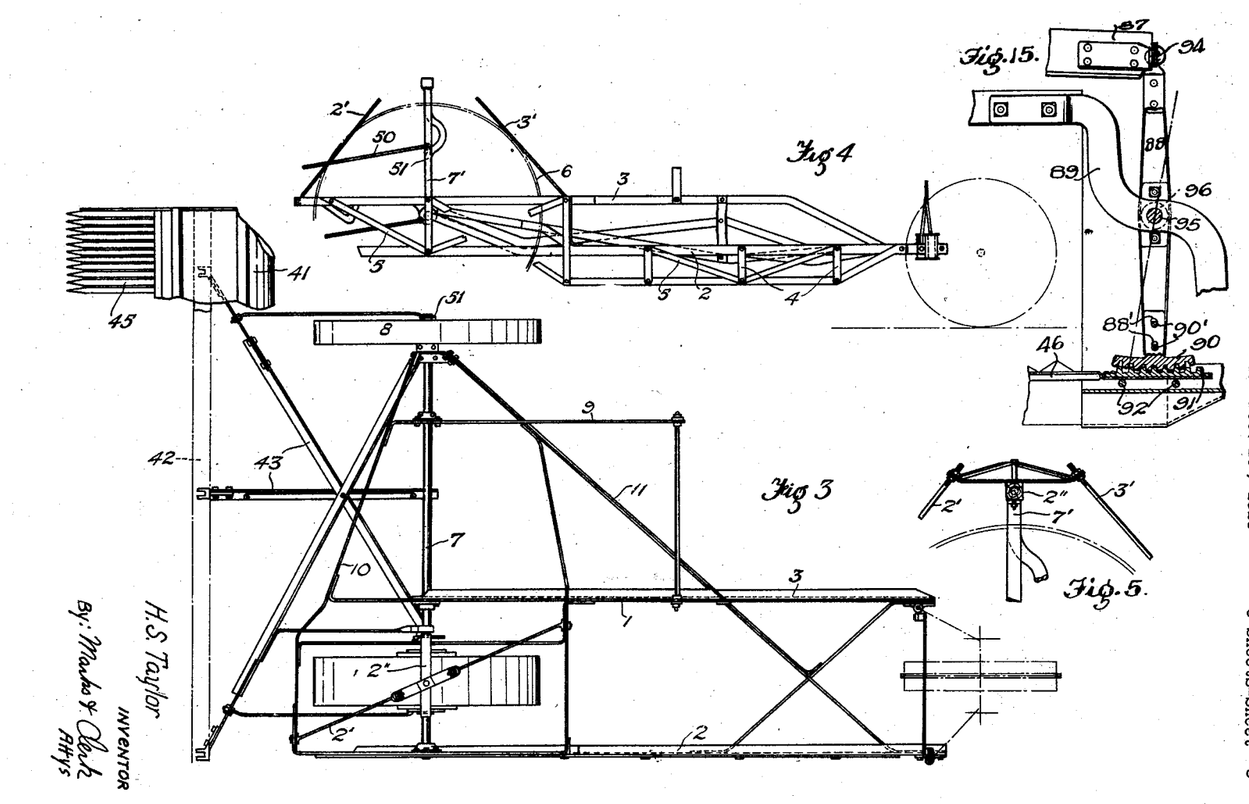
Figure 3 is a view in plan of the main frame of the machine.
Figure 4 is a view in side elevation of part of the main frame of the machine.
Figure 5 is a view in side elevation of part of the main frame and hereinafter will be fully described.
Figure 15 is a view in front elevation (partly in section) of the mechanism shown in Figure 14.
Figures 6, 7, 8, 9:
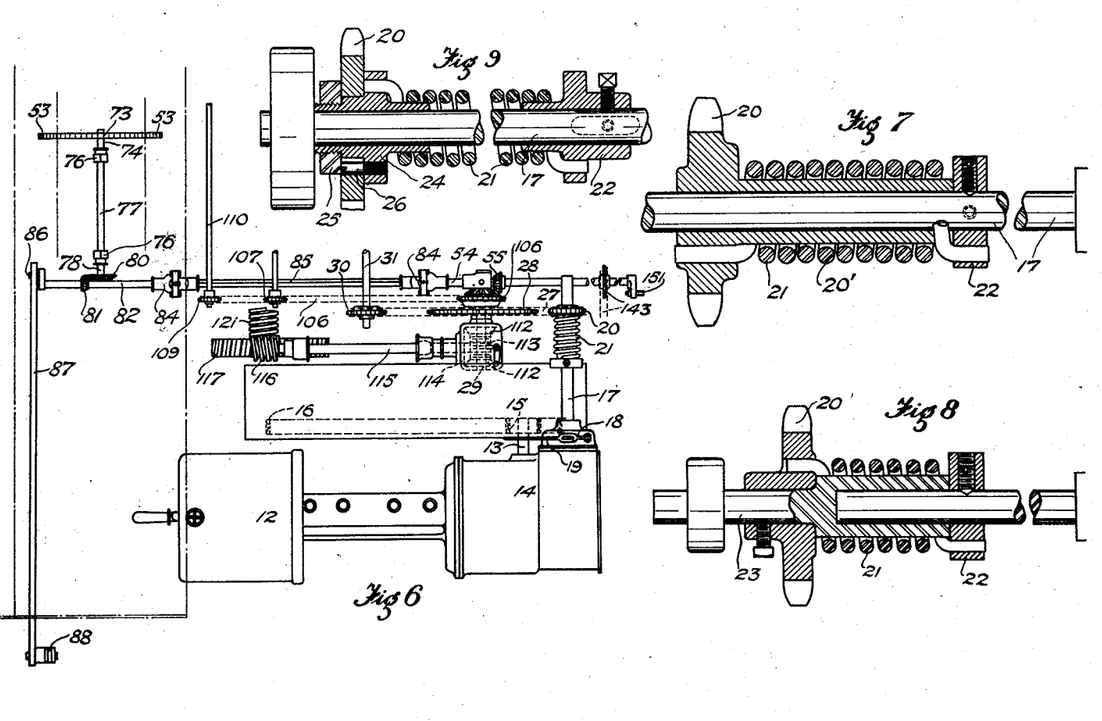
Figure 6 is a view in plan of the power transmitting mechanism of the machine.
Figure 7 is a view in sectional front elevation of part of the power transmitting mechanism and hereafter will be fully described.
Figure 8 and 9 are views similar to Figure 7 and illustrate modifications of the invention.

The engine can be of any approved type and when an internal combustion engine is used it may be arranged fore and aft on the main frame with the transmission gearing arranged at the rear thereof as shown in Figures 1, 2 and 6.

A drive shaft 13 projects laterally from the offside of the engine and is driven by gearing (not shown) from one of the shafts in the transmission case 14. The inner end of this drive shaft 13 is fitted with a pinion 15 which meshes with a circular rack 16 on the near transport wheel 6 whereby motion can be imparted to the same when the engine is running and the engine clutch is engaged.

A second drive shaft 17 projects laterally from the rear of the transmission case 14 and this shaft is driven by gearing from the rear part of one of the shafts of the transmission gearing which can be of any approved design.

The second drive shaft 17 is driven through a clutch of approved construction located in a housing 18 on the side of the transmission case and a lever 19 is provided for placing the clutch in and out of engagement when motion is to be imparted to or cut off from the shaft 17 and operative parts of the machine.

The inner end of the second drive shaft 17 is fitted with a sprocket 20 or gear wheel for transmitting motion to the operative parts of the machine and the said sprocket is resiliently connected to the second drive shaft by means of a torsional spring 21 or the like. The sprocket 20 is formed with a long boss 20' which encircles the shaft 17 and is surrounded by the spring 21. When a torsional spring 21 is used to resiliently connect the sprocket 20 to the shaft 17 it is placed around the boss 20' and one end is connected to the said sprocket and the other end is attached to a collar 22 on the shaft.

In an alternative construction the sprocket 20 is fixedly mounted on a short spindle 23 having its outer end bored axially to fit neatly over the inner end of the second drive shaft 17 and the torsional spring 21 is arranged to resiliently connect the sprocket to the drive shaft as above described. The inner end of the second drive shaft or the extension thereon is mounted in a bearing on a support on the main frame.

In Figure 9 the sprocket 20 is shown attached to a flange on a sleeve 24, rotatively mounted on the second drive shaft, by means of a nut 25 and screw pin 26. One end of the spring 21 is connected to the flange on the sleeve 24 and the opposite end with a flange on the collar 22.

In this construction both the sleeve and the collar are provided with inwardly projecting reduced portions which fit neatly within the ends of the spring 21 leaving ample space between the remaining portion of the spring and shaft to enable it to buckle and twist under torsional strains without bearing unduly hard upon the shaft and occasioning excessive friction and wear.

The resiliency in the drive provided by the spring connection between the shaft 17 and sprocket 20 will absorb any shock or jar likely to be transmitted to the operative parts and gearing when starting the engine or applying a heavy load suddenly to the said operative parts.

The sprocket 20 on the drive shaft 17 is adapted to take a chain 27 which passes around a larger sprocket 28 on a counter shaft 29 mounted transversely on the main frame and around a sprocket 30 having a free wheel engagement with the spindle 31 of a thrasher drum 32 whereby when the drive shaft 17 is stopped the rapidly rotating drum can continue to revolve freely and without throwing any strain on the driving gear.

The thrasher drum 32 is mounted on the main frame in advance of the transverse axle 7 supporting the transport wheels and the material delivered to the thrasher drum from the crop gathering mechanism, mounted adjustably on the front of the main frame, is thrown up a rearwardly inclined throat 33 on to the forward end of straw walkers 34 operating within a casing 35 and above an inclined tray 36 over which the clean grain and heads together with chaff and small pieces of straw are directed to the front end of the winnower 37 located therebelow.

The blast for the winnower is produced by a pair of fans 38; one situated at each end of the thrasher drum and surrounding the spindle thereof.

The throats 39 (shown in dotted lines in Figure 2) of the fans are directed downwardly and rearwardly and unite at the front of the winnower 37 to direct the blast over and through the riddles therein. The winnower is shown in dotted lines in Figure 2 and can be made in any approved way.

The crop gathering mechanism consists of a conveyor casing 41 mounted on a transverse beam 42 pivotally supported on the forward end of an adjustable frame 43 having its rear end pivotally connected to the transverse axle 7 or to a suitable part of the main frame.

A comb bar 44 is fitted beneath the conveyor casing 41 and projecting forwardly from the said comb bar is a comb 45 of ordinary design.

A knife is mounted reciprocatingly at the base of the comb to sever the straw passing rearwardly between the teeth thereof and the knife bar 46 is driven from one end as hereinafter described.

A pair of helical conveyors 47 are mounted transversely in each end of the conveyor casing and are constructed in such a manner that the material severed by the knife will be carried to the lower part of an elevator 48 fitted to and communicating with the back of the said casing and arranged to deliver the material to the thrasher drum.

The upper part of the conveyor casing 41 is connected by tie bars 50 to arms 51 projecting upwardly from the main frame whereby the said casing will be maintained more or less horizontally when the crop gathering mechanism is being raised and lowered.

A spindle 78 supported in a bracket 79 mounted on the conveyor casing 41 is fitted with a bevel wheel 80 which meshes with a like wheel 81 fitted to a shaft 82 supported at right angles thereto in bearings 83 and connected by universal joints 84 and an extensible shaft 85 to the longitudinal shaft 54 driven by the bevel gearing 55 from the inner end of the counter shaft 29 on the main frame.

The front end of the shaft 82 mounted in the bearings 83 on the top of the conveyor casing is provided with a crank 86 which is connected by a pitman 87 to the upper end of a vertical sway bar 88.

The sway bar 88 is supported by a bracket 89 on the near end of the conveyor casing and the lower end of the said sway bar is provided with a toothed sector 90 which meshes with a short rack 91 on the adjacent end of the knife bar 46. The rack on the end of the knife bar is adapted to reciprocate on rollers 92 or other antifrictional members supported between side cheeks 93 which may be formed as part of the bracket 89 for supporting the sway bar or constructed and supported in any other approved way.

The upper end of the sway bar 88 is connected to the adjacent end of the pitman 87 by a ball and socket joint 94.

Figures 18, 19:
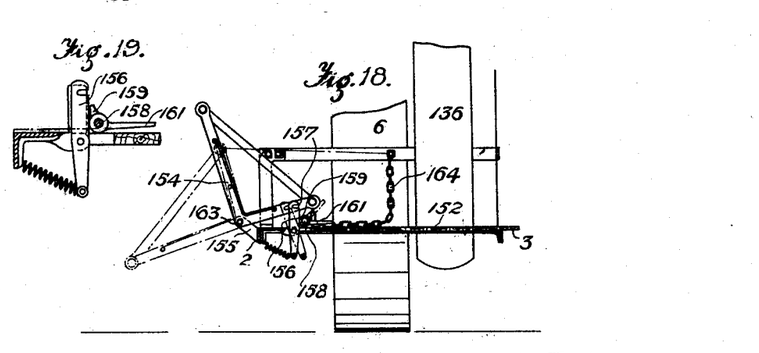
Figure 18 is a view in sectional rear elevation taken on the dotted line 25—25 of Figure 16.
Figures 19 is a view in sectional rear elevation of the device for releasably retaining the dumping frame in its raised position on the bagging platform, and hereinafter will be fully described.

The pivotal connection between the bracket 89 and the sway bar may comprise a short pin 95 having rounded ends adapted to be accommodated in cup shaped bearings 96 fitted to opposite sides of a looped central portion of the said sway bar, as illustrated in Figure 18 of the drawings.

The central portion of the sway bar preferably is made of two flat bars and the cup shaped bearings are bolted to the same in such a manner as to enable the said bearings to be adjusted with respect to the pivot pin to provide for wear.

The ball and socket connection between the upper end of the sway bar and the pitman and the pivotal support above described enable the parts to readily adjust themselves to ensure freedom of movement when the parts are not accurately fitted or when operating under adverse conditions.

The sector 90 preferably is adjustably secured as by means of bolts 90' and slots 88' to the lower end of the sway bar 88 whereby the said quadrant can be adjusted to mesh deeper or shallower with the rack 91 as desired.

A sprocket 105 is fitted to the counter shaft 29 and this sprocket is adapted to impart motion to a chain 106 which passes over a sprocket 107 fitted to a feed roller 108 operating above the mouth of the thrasher drum and around a drive sprocket 109 mounted on a spindle 110 passing through the side cheeks 49 of the casing of the thrasher drum.

An adjustable tensioning roller 111 (shown in dotted lines in Figure 1) is arranged to maintain a desired tension on the chain 106 for imparting movement to the feed roller 108 and to the elevator 48.

A pair of bevel wheels 112 are rotatively mounted on the counter shaft 29 and a clutch member 113 slidably mounted on the said shaft is adapted to be placed in engagement with clutch teeth on one or other of the said bevel wheels whereby a left or right hand movement can be imparted to a bevel pinion 114 meshing with the said bevel wheels as desired, (shown in dotted lines in Figure 6).

The bevel pinion 114 is mounted on a longitudinally disposed shaft 115 having a worm 116 on its front end meshing with a toothed sector 117 fitted to one end of a shaft 118 supported transversely in bearings on the main frame.

The shaft 118 supporting the sector 117 is provided with a curved arm 119 having a member 120 connecting its free end to the adjustable frame 43 carrying the reaping and conveying mechanism.

A torsional compensating spring 121 mounted on the said shaft 118 is adapted to maintain an upward pressure on the said arm 119 whereby the raising of the adjustable frame is facilitated.

The clutch member 113 on the counter shaft is operated by a lever so that a desired motion can be imparted to the worm and sector to effect the raising and lowering of the adjustable frame as desired.

A fan 122 is located above the throat of the thrasher drum and the throat 123 of this fan is arranged to direct a blast of air through the material thrown upwardly from the thrasher drum and above the front end of the straw walkers.

The front of the hood of the straw walkers is provided with a raised part 124 curving downwardly at its rear end and the space within the said raised part provides ample room for the opening up of the material projected thereinto from the thrasher drum whereby a more or less free passage is provided for the blast from the fan 122. Moreover, the said blast tends to maintain the material in an open condition whereby the grain and heads or heavier particles will gravitate more or less freely to and through the front ends of the straw walkers. The passing of the blast of air through the material furthermore tends to maintain the lighter particles at a maximum distance from the straw walkers in their passage thereover and thereby facilitates the passage of the grain and heads through the straw walkers to the reciprocating tray located therebeneath.

A hinged flap 125 extends transversely of the casing of the straw walkers beneath the rear end of the raised part 124 of the hood directly at the rear of the fan 122 and this flap tends not only to confine the blast within the raised part of the cover, but also ensures the material passing correctly over the straw walkers.

Figures 10, 11, 12:
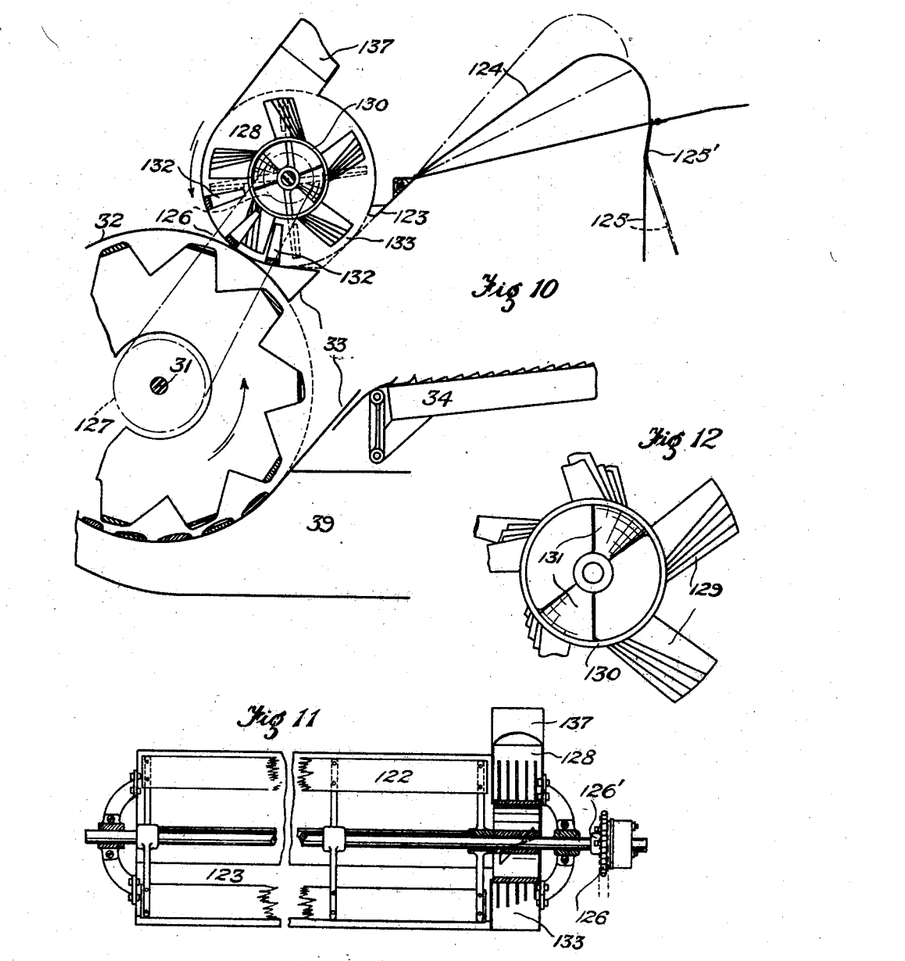
Figure 10 is a view in sectional side elevation illustrating certain improvements in the auxiliary thrasher associated with a fan for re-treating the heads and for directing a blast of air through the straw passing from the thrasher drum to the front end of the straw walkers.
Figure 11 is a view in sectional elevation of the fan and auxiliary thrasher shown in Figure 10.
Figure 12 is a view in side elevation of a detail in the construction of the auxiliary thrasher.

The flap 125 is hingedly connected to a plate 125' depending from the hood at the rear of the raised portion 125. The said depending plate supporting the flap 125 may be disposed vertically or it may have a slight forward inclination as shown in Figure 10 and serves as a continuation of the downwardly curved back of the raised portion and prolongs the curved path taken by the straw projected into the raised part 124 of the hood.

The raised part 124 of the hood can be hingedly mounted at one end and provided with means for detachably securing it in position whereby it can be raised (as shown in dotted lines in Figure 10) to permit access to be had to the front end of the straw walkers 34 or to the space thereabove. The spindle of the fan 122 is driven by chain and sprocket gearing 126 from a sprocket 127 fitted to the spindle of the thrasher drum 32 and an auxiliary thrasher 128 may be mounted at one end of the fan 122 to treat the headings which are delivered thereto from the winnower by an elevator, see Fig. 10.

The auxiliary thrasher 128 may be of the peg drum type (as shown) and the revolving pegs 129 may be mounted on a drum 130 supported by helical arms 131 from a boss secured to the spindle of the fan.

The object in mounting the drum supporting the pegs 129 in the above manner is to provide room for air to freely enter the end of the fan 122 at which the peg drum is situated and the helical supporting arms tend to facilitate the entrance and passage of air through the drum. The casing of the auxiliary thrasher is provided with a plurality of rows of stationary teeth 132 which are arranged to lie between the paths of the pegs on the said drum.

The material passing through the auxiliary thrasher is directed through a throat 133 on to the front end of the straw walkers.

The sprocket of the gearing 126 for imparting motion to the spindle of the fan 122 is frictionally mounted on the said spindle so as to obviate breakages or distortion of the parts associated therewith should the parts of the fan or auxiliary thrasher become jammed within the casings.

The sprocket fits over a sleeve secured to the fan spindle by means of set screws and the outer face of the said sleeve is formed with a collar 126' having deep recesses therein accommodating balls 128'.

Figure 13:
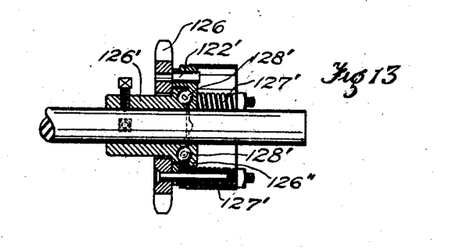
Figure 13 is a view in sectional plan of a release drive through which motion is imparted to the spindle of the auxiliary thrasher and fan associated therewith.
Figure 16:
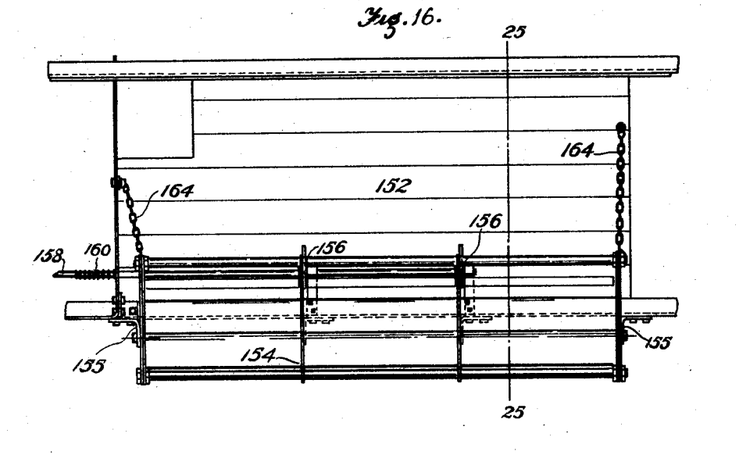
Figure 16 is a view in plan of the bagging platform on the near side of the machine and a dumping frame associated with the said platform.
Figure 17:
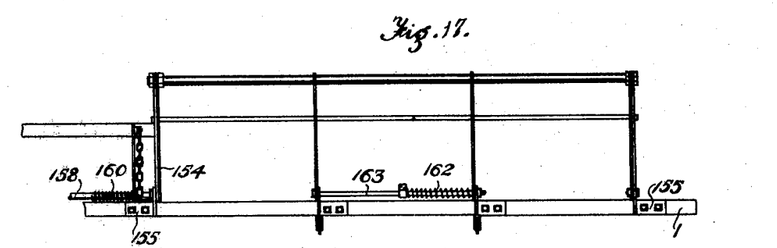
Figure 17 is a view in side elevation of Figure 16.

The balls 128' project slightly beyond the recesses in the collar 126' and their projecting portions are engaged by shallow recesses formed in a collar 126'' which fits loosely over the spindle and is forced to bear against said balls by means of compression springs 127' mounted on bolts passing through the sprocket and through the collar. The drive is taken on a pin 122' which passes through the sprocket and the collar 126'', see Figure 13.

A desired frictional resistance to the rotation of the said sprocket is obtained by screwing up the nuts on the bolts to adjust the pressure of the springs 127'.

Should the auxiliary thrasher become jammed or offer excessive resistance to rotation from any cause the collar 126'' will ratchet over the faces of the balls until the obstruction is removed. A friction drive constructed as above described will be found exceedingly efficient when employed to transmit high speeds to the shaft of a thrasher or fan.

The elevators 135 and 136 for raising the headings and clean grain from the winnower pass upwardly at the front end of the bagging platform and the headings are directed by the first mentioned elevator to a chute 137 leading to the thrasher drum 32.

In lieu of returning the headings to the thrasher drum 32 from the upper end of the elevator 135 the chute 137 can be arranged to deliver them to the auxiliary thrasher 128, as shown in Figure 10 of the drawings.

The clean grain raised by the second mentioned elevator 136 is directed into a rotary screen 138 disposed horizontally at the rear of the elevator casing and the first quality grain passes from the screen through a chute 139 to a hopper 140 situated above the bagging platform.

The second quality grain is directed through a chute 141 passing from the rotary screen to a hopper situated at the rear part of the bagging platform and provided with a bag holding device near an outlet therefrom. The hopper for receiving the second quality grain and the device for holding a bag near an outlet therefrom are not illustrated as they do not form essential parts of the invention, and any form of container and bag supporting device may be employed for the purpose. The grain and headings are carried upward in the elevators by buckets fitted to endless chains or belts passing over sprockets or pulleys fitted to spindles mounted in the upper and lower ends of the said elevators in the ordinary way.

The spindle 142 passing through the upper ends of the elevators 135 and 136 is operated by chain and sprocket gearing 143 from the longitudinal shaft 54 driven by bevel gearings 55 from the counter shaft 29 and the rotary screen 138 is operated by chain and sprocket gearing 144 from the opposite end of the said spindle.

The sprocket on the front end of the spindle 142 is connected thereto by a spring release coupling whereby the said sprocket will rotate on the spindle under a predetermined load which is less than that likely to do damage to the elevators should the parts become jammed.

The chain for driving the rotary screen also passes around a sprocket 145 on a short spindle 146 which is connected by a universal joint 147 to a shaft 148 for transmitting motion through gearing 149 to a crank shaft 150 carrying the rear ends of the straw walkers.

The rear end of the longitudinal shaft 54 from which motion is taken to drive the elevators 135 and 136 is fitted with a crank 151 which is adapted to impart a lateral shaking movement to the winnower.

The hopper 140 located above the bagging platform and arranged to receive the first quality grain from the rotary screen is provided with outlets beneath each of which a bag holder can be supported in any approved way.

A bagging platform 152 is mounted on the rear of the longitudinal members 2 and 3 of the main frame on the near side of the machine and this bagging platform may be provided with a wall or railing on its front and rear ends and on the inside thereof.

The outer edge of the bagging platform is provided with an L-shaped dumping frame 154 which is pivotally supported at its angle on brackets 155 fitted to the said platform.

One side of the said dumping frame 154 normally is maintained more or less horizontally and the opposite side extends approximately vertically from the edge of the said platform.

The dumping frame is retained in its normal position by spring actuated pawls 156 which are adapted to engage studs 157 on the side of the dumping frame lying close to the platform.

When the filled bags are removed from the bag holders and their mouths secured they are placed on the dumping frame, and when a full complement of bags has been placed thereon the retaining pawls 156 are released to allow the dumping frame to tilt outwardly and deposit the bags on the ground.

The retaining pawls are released by imparting a rocking movement to a shaft 158 having arms 159 arranged to bear against the retaining pawls and the said rock shaft is returned to its normal position by means of a spring 160 operating thereon. The shaft 158 is fitted with an arm 161 which normally rests upon the platform 134 and limits the movement of the said rock shaft 158 (Figures 25 and 26). The arm 161 is so arranged that when the rockshaft is operated it will contact with and raise the lower part of the dumping frame and cause it to swing outwardly to deposit the bags of grain. The arms 159 and 161 are disposed in such a way that the second mentioned arm will not be brought into operation until the pawls 156 have been released.

The rock shaft 158 is operated by a lever (not shown) situated in any convenient position and when the control lever is situated adjacent to the driver's seat suitable connections between the lever and the rock shaft are provided for actuating the latter.

The dumping frame is returned to its normal position, after being tilted to deposit bags on the ground, by a torsional spring 162 fitted to a rod 163 at the angle of the said frame or by a spring or springs arranged in any other approved way. Means such as flexible connecting members 164 are provided for preventing the dumping frame being tilted sufficient to cause the outer side thereof to strike the ground when the filled bags are being dumped therefrom.

In the modification of the invention illustrated in Figures 20 and 21, brackets 165 are fitted to the angle of the dumping frame and these brackets are pivotally supported on pins 166 which are mounted on the supporting brackets 155 mounted on the main frame of the machine.

The brackets 165 are provided with depending abutments which may be of horn shaped formation as shown in the drawings or they may be given any other approved construction.

The rock shaft 158 is supported in the inner parts of the brackets 155 and fitted rigidly to the said shaft are bosses carrying arms 167 the ends of which are adapted to bear against the abutments on the brackets 165. Striker arms 168 project from the opposite side of the bosses on the rockshaft and these striker arms are adapted to bear against the edge of the bagging platform or part fitted thereto. The dumping frame is prevented from swinging outwardly by the arms 167 bearing against the abutments.

When the rock shaft 158 is rotated the arms 167 are moved away from the abutments and the stroker arms are adapted to bear against the dumping frame or the curved faces 169 formed on the brackets 165 so as to cause the dumping frame to be swung outwardly to deposit bags of grain on the ground.

When the dumping frame is tilted outwardly the arms 167 bear against the outer faces of the abutments and the spring acting on the said rock shaft will return the arms to their normal positions and lock the dumping frame securely to the bagging platform when it has been returned to its normal position.

A rack is mounted on the rear end of the bagging platform 134 for holding a supply of empty bags convenient to the attendant in charge of the bag filling operations.

The steering wheel 169' of the machine is mounted at the rear of the longitudinal beams 2 and 3 on the near side of the main frame and preferably at the rear of the bagging platform, and the said wheel is controlled by any approved means.

Some or all of the improvements hereinbefore described can be adapted to different types of reaper thrasher or harvester machines at present in use and wherever they are so adapted to will be found that greater efficiency will result.

I claim:—

1. In reaper thrasher and harvesting machines, a main frame, a through axle mounted on the frame near the front thereof, transport wheels on the axle, a steering wheel supported at the rear of the frame, an engine mounted on the near side and forward part of the main frame, a drive shaft projecting transversely from the engine, a circular rack on the near side transport wheel, a pinion on the drive shaft meshing with the circular rack, an adjustable frame pivotally supported on the main frame, crop gathering mechanism supported by the adjustable frame, transverse conveyors forming part of the crop gathering mechanism, means associated with the inner ends of the transverse conveyors to impart motion to the same, a thrasher drum supported on the main frame, an elevator at the rear of the crop gathering mechanism for delivering the material directed thereto by the opposed conveyors to the thrasher drum, straw walkers and a winnower associated with the thrasher drum, a second drive shaft on the engine, and gearing operated from the second drive shaft for transmitting motion to the operative parts of the machine.

2. In machines of the class described, a main frame, an adjustable frame on the front of the main frame a transverse conveyor casing on the front of the adjustable frame, a bracket projection from the end of the conveyor casing, a pivot pin supported by the bracket and having rounded ends thereon, a sway bar, opposed cup shaped bearings on the sway bar embracing the ends of the pivot pin, a knife bar connected to the lower end of the sway bar, and means for imparting an oscillating movement to the sway bar to reciprocate the knife.

3. In machines of the class described, an adjustable frame supporting a transverse conveyor casing on the front end thereof, a bracket projecting from the end of the conveyor casing, a pivot pin supported by the bracket and having rounded ends thereon, a sway bar fitted with opposed cup shaped bearings embracing the ends of the pivot pin, a knife bar connected to the lower end of the sway bar, a crank and pitman for imparting an oscillating movement to the sway bar, and a ball and socket connection between the pitman and the upper end of the sway bar.

4. In machines of the class described, a transverse conveyor casing, a knife bar reciprocatingly supported on the conveyor casing, a bracket fitted to the end of the conveyor casing, a pivot pin removably supported by the bracket and having rounded ends, a sway bar fitted with opposed cup-shaped bearings embracing the ends of the pivot pin, means for adjusting the cup-shaped bearings to and from each other to provide for wear, a toothed sector on the lower end of the sway bar, a rack on the end of the knife bar and meshing with the sector, and means for supporting the rack on the knife bar whereby it will be guided in a straight path when the sway bar is oscillated.

5. In machines of the class described, a transverse conveyor casing, an opening in the front of the transverse conveyor casing, a crop gathering comb projecting forwardly from the conveyor casing, a knife reciprocatingly mounted at the base of the comb, a horizontal rack fitted to the end of the knife bar, a sway bar pivotally mounted on the end of the conveyor casing, a toothed sector on the lower end of the sway bar meshing with the rack on the knife bar, and means for imparting an oscillating movement to the said sway bar to reciprocate the knife.

6. In machines of the class described, the combination with the subject matter of claim 5, of a pivot pin supporting the sway bar, rounded ends on the pins, and adjustable cup shaped bearings engaging the ends of the pivot pin.

7. In machines of the class described, a reaping knife, a horizontal rack fitted to one end of the reaping knife, an oscillatable sway bar and a toothed sector on the lower end of the said sway bar meshing with the said rack, constructed, arranged and operating whereby when the sway bar is oscillated a reciprocating movement will be imparted to the reaping knife.

8. In machines of the class described, the combination with the subject matter of claim 7 of a shaft supported rotatively in bearings above the transverse conveyor casing, a crank on the front end of the said shaft, and a pitman connecting the said crank to the upper end of the sway bar.

9. In machines of the class described, an adjustable frame supporting a transverse conveyor casing on the front end thereof, a bracket projecting from the end of the conveyor casing, a pivot pin supported by the bracket and having round ends, a sway bar, opposed cup-shaped bearings on the sway bar embracing the ends of the pivot pin, means for adjusting the cup-shaped bearings to and from each other to provide for wear, a toothed sector on the lower end of the sway bar, a rack on the end of a knife bar and meshing with the sector, rollers supporting the rack, means for oscillating the said sway bar, and means for guiding the rack in a straight line when the sway bar is oscillated.

10. In machines of the class described, a main frame having an engine mounted thereon, a thrasher and winnower mounted on the main frame, an adjustable frame supported on the front of the main frame and carrying crop gathering and conveying mechanism, an elevator for delivering grain and straw from the crop gathering and conveying mechanism to the thrasher, a through axle on the main frame supporting transport wheels, a steering wheel on the rear of the main frame, a circular rack on the near side transport wheel, a pinion meshing with the rack and driven from a drive shaft projecting inwardly from the transmission gearing of the engine, a second drive shaft projecting inwardly from the transmission gearing of the engine, a sprocket resiliently connected to the second drive shaft, a sprocket on the countershaft, a free wheel sprocket on the spindle of the thrasher, a sprocket chain passing around the resiliently mounted sprocket on the second drive shaft around the sprocket on the counter shaft and the free wheel sprocket on the spindle of the thrasher, and means for imparting motion from the counter shaft to the raising and lowering mechanism of the adjustable frame and to the crop gathering mechanism and winnower.

11. In machines of the class described the combination with the subject matter of claim 10, of elevators on the near side of the winnower for elevating the clean grain and headings, a chute for directing the heads from the upper end of one elevator to the thrasher drum, a rotary screen arranged in communication with the upper end of the elevator for the clean grain, a longitudinal shaft driven by gearing from the counter-shaft, a spindle passing through the upper end of the elevator driven by chain and sprockets from the longitudinal shaft, and sprockets and chain gearing on the opposite end of the spindle for imparting rotation to the rotary screen and to a shaft carrying gearing for rotating the cranks of a straw walker located above the winnower.

12. In machines of the class described the combination with the subject matter of claim 10, of a second sprocket on the counter shaft, a spindle passing through the lower end of the elevator at the rear of the conveyor casing, a feed roller disposed at the front of the mouth of the thrasher drum, and sprocket and chain gearing for imparting motion to the spindle of the elevator and to the feed roller from the second sprocket on the counter shaft.

13. In machines of this class described, a main frame having a bagging platform on one side thereof, an L-shaped dumping frame having its angle portion pivotally mounted on or near the edge of the platform, means for releasably retaining the dumping frame with one side leaning outwardly from the bagging platform, pawls pivoted to the platform and adapted to engage pins on the horizontal or approximately horizontal side of the bagging platform, springs for maintaining the pawls in engagement with the said pins, a rock shaft disposed longitudinally of the platform, and means on the shaft for releasing the pawls and tilting the dumping frame to deposit the filled bags of grain on to the ground.

14. In machines of the class described the combination with the subject matter of claim 13, of arms on the said rock shaft adapted to bear against and release the said pawls when the rock shaft is partially rotated, means for returning the rock shaft to its normal position after being operated, and a spring for returning the dumping frame to its normal position after being tilted to deposit bags of grain on the ground.

15. In machines of the class described, the combination with the subject matter of claim 13, of a rock shaft disposed longitudinally of the bagging platform, means for imparting a partial rotation to the rock shaft, striker arms on the longitudinal shaft adapted to release the pawls upon the partial rotation of the said shaft, and arms on the said shaft adapted to bear against and tilt the dumping frame when the pawls have been released.

16. In machines of the class described, a main frame having a bagging platform on one side thereof, an L-shaped dumping frame having its angle portion pivotally mounted on the edge of the platform or to brackets fitted thereto, an abutment depending from the pivot point of the dumping frame, a rock shaft having diametrically opposed arms fitted thereto, one of the said opposed arms being adapted to engage with the abutment to retain the dumping frame in its normal position and the opposite arm being adapted to strike against and tilt the dumping frame when the rock shaft is rotated.

17. In machines of the class described the combination with the subject matter of claim 16, of brackets fitted to the angle of the dumping frame and pivotally supported on the bagging platform, an abutment depending from the said bracket adapted to co-act with one of the arms on the rock shaft, a curved face on the striker arm, and a curved face on the adjacent part of the bracket on the dumping frame, substantially as described.

In witness whereof I hereunto affix my signature.

HEADLIE S. TAYLOR.